Patented Sept. 14, 1948

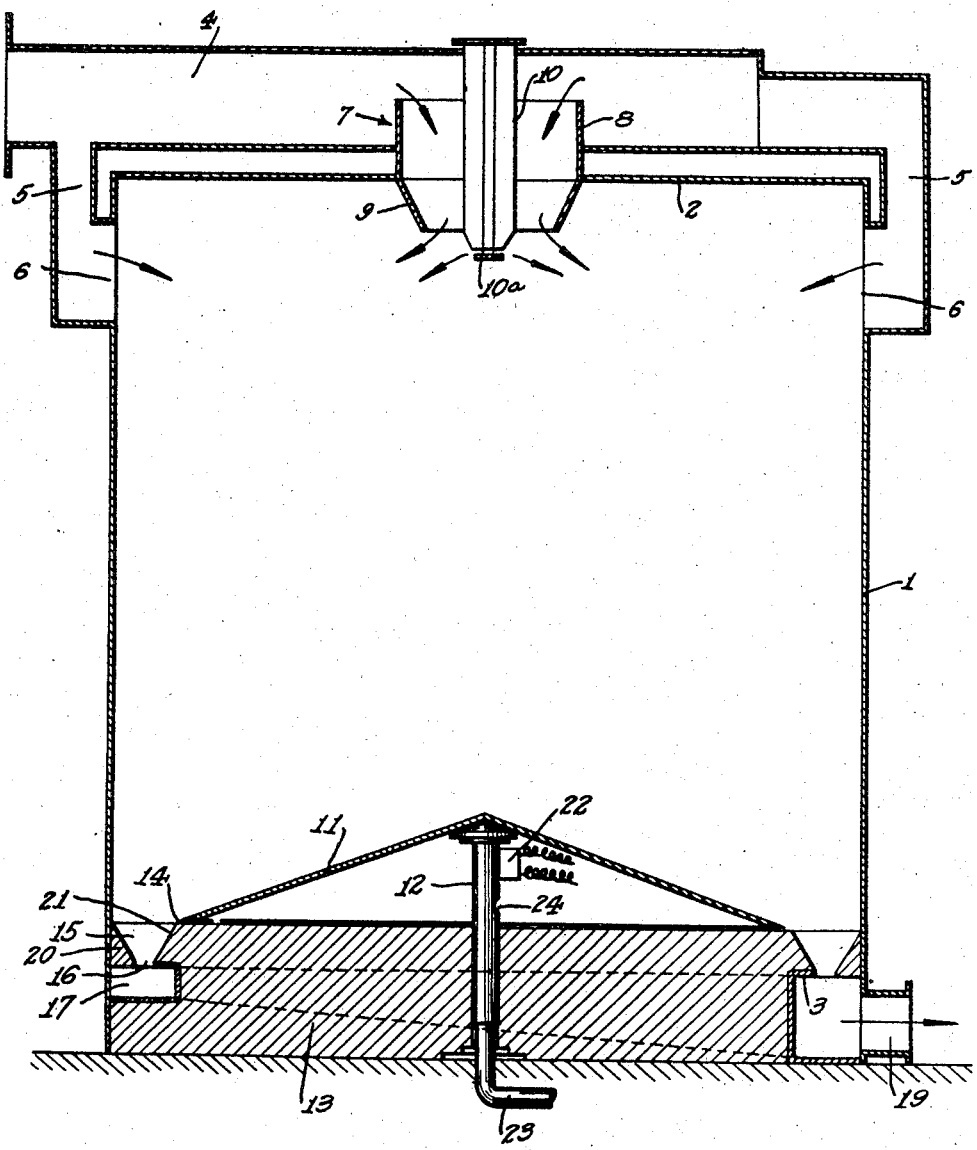

2,449,366

UNITED STATES PATENT OFFICE 2,449,366

VIBRATING CONICAL DISCHARGE MEANS FOR SPRAY DRIERS

William Spencer Bowen, Westfield, and Walter Isaac McCrum, Belmar, N. J., assignors to Bowen Research Corporation, Garwood, N. J., a corporation of New Jersey Application April 21, 1944, Serial No. 532,164

3 Claims. (Cl. 159—45)

The present invention relates to improvements in spray dryers and more particularly, to improvements in means for sweeping or removing the precipitated dust or powder from the lower parts of spray drying chambers.

An object of the invention is to provide novel and advantageous means for collecting and withdrawing from the dryer dust or powder precipitated therein.

Another object is to provide novel and advantageous means for collecting and removing from a hot air dryer precipitated powder or dust, in which means there are no moving parts in the paths of the hot air currents.

Another object of the present invention is to provide means for removing precipitated dust or powder from a spray dryer without any scraping mechanism.

Another object is to provide means for collecting the dust or powder in a spray drying chamber and depositing it, without the use of any scraping mechanism, at the periphery of the bottom of the chamber.

Another object is to provide in a spray drying chamber, a device for deflecting precipitated dust or powder to the periphery of the chamber and means for vibrating said deflecting device to assure removal or discharge of the dust or powder from the deflecting device.

Another object is to provide improved means for collecting dust or powder precipitated in a spray drying chamber, including a deflector, the upper surface of which extends from a central part or peak downwardly and outwardly substantially to the periphery of the chamber.

In carrying out certain features of the invention the spray drying chamber may be provided with a generally conical deflector having its peak or tip at the axis of the chamber and its upper surface sloping downwardly and outwardly to direct the dust or powder into an annular channel preparatory to removal from the apparatus by suitable means. Vibrating means for the cone or deflector may be utilized to assure downward movement of the dust on the surface of the deflector.

Other features and advantages will appear upon consideration of the following detailed description and of the drawing, in which the single figure is a view in vertical cross-section taken on a plane passing through the axis of a drying chamber constructed in accordance with the present invention.

As illustrated in the drawing, there is a spray drying chamber in the form of a vertical cylinder with a peripheral or circumferential wall 1, a top 2 and a bottom 3. Above the top 2, is a generally horizontal hot air inlet duct 4 supplying hot air to the interior of the chamber through one or more branch ducts 5 and side inlets 6 which may be side inlet heads or nozzles, and through a central air inlet 7 at the top of the chamber and comprising a tubular upper portion 8 connecting the interior of the chamber and the inlet duct 4 into which it projects a substantial distance, and a lower portion 9 tapered so as to decrease downwardly in horizontal cross-section. Extending downwardly through the top of the inlet duct 4 and axially through the central air inlet 7 is a spray device 10 so arranged that the spray therefrom is thrown against an atomizer 10a which directs the stream toward the side wall 1 of the spray drying chamber, and through the hot air current which enters the chamber by way of the central air inlet 7. The spray is dried by the hot air currents and falls in the form of dust or powder toward the lower part of the spray drying chamber.

The present invention relates more particularly to the collection and removal of the products treated in the chamber from the bottom thereof. As illustrated, the dust or powder may fall on a deflector 11 having a raised central point or peak and an upper surface sloping outwardly and downwardly, preferably in the form of a cone, to direct the dust or powder toward the periphery of the chamber.

The cone 11 is mounted upon a pedestal 12 which is slidably supported in a base 13 with a friction fit and which supports the cone in such fashion that the periphery of the cone is adjustably supported to provide a space 14 between the edge of the cone and the base.

Below the periphery of the cone a V-shaped trough 15 is provided for receiving material that falls from the conical member 11. The trough is formed with an open bottom 16 that communicates with an annular discharge duct 17 communicating with a discharge outlet 19. The trough 15 may here be formed in the base 13, or as illustrated in the drawing, an annular inwardly sloping ring 20 may be provided on the inner wall of the chamber 1, this ring co-operating with an outwardly projecting and sloping flange member 21 formed on the base 13.

In order that material falling upon the cone member 11 may not lodge thereon, but may be directed into the trough 15 and discharge chamber 17, an electrical vibrator 22 is mounted upon the standard 12 or the under-surface of the cone member 11 and connected in a suitable electrical circuit so that its vibrating action will cause the surface of the conical member 11 to vibrate and thus dislodge any material that may have a tendency to adhere thereto.

If desired, cooling air may be introduced beneath the conical member 11 through the pedestal 12 in desired quantities to facilitate movement of the material into the trough 15 and chamber 17. A duct 23 is illustrated schematically as a means for furnishing such air, the air being discharged through an opening 24 formed in the pedestal or spindle 12. In one form of this apparatus which is found to function very effectively, the velocity of the air passing through the discharge opening 16 is 6,000 feet per minute, while the velocity of the air in the annular chamber 17 is 4,000 feet per minute at the point of smallest cross-section, and this difference in velocity has been found to be an effective means for discharging the material from the drying chamber 1.

While the invention has been described with reference to the accompanying drawing, it is not to be limited save as defined in the appended claims.

We claim:

1. In a device for removing finely divided material from a chamber, the combination of a chamber floor having a central opening and a peripheral channel therein, a discharge outlet connected to said channel, a hollow, non-rotatable, substantially conical deflector having its apex upward and its edge adjacent to said channel, and substantially completely covering the portion of the floor enclosed by said channel, adjustable means centrally of and supporting said deflector in spaced relation to said floor to provide a space between said floor and said edge of said deflector of variable width, means for introducing air through said central opening for flow outwardly through said space between the floor of the chamber and the lower edge of the deflector to aid in discharging and cooling said finely divided material and preventing said finely divided material from accumulating between said floor and said deflector, and means for vibrating said deflector.

2. In a device for removing finely divided material from a chamber having a bottom, the combination of an annular channel in said bottom, a discharge outlet connected to said channel, a hollow, non-rotatable, conical deflector to direct material deposited thereon into said annular channel and substantially completely covering the portion of said floor enclosed by said channel, a standard connected to said bottom and to the midportion of said deflector for supporting said deflector with its peripheral edge in spaced relation to said bottom, means for introducing gas under pressure beneath said deflector to aid in discharging and cooling said finely divided material and preventing said finely divided material from accumulating between said floor and said deflector, for flow outward between said edge and said bottom, and means for vibrating said deflector.

3. In a device for removing finely divided material from a chamber having a bottom, the combination of an annular channel in said bottom, a discharge outlet connected to said channel, a hollow, non-rotatable, conical deflector to direct material deposited thereon into said annular channel and substantially completely covering the portion of the floor enclosed by said channel, a longitudinally adjustable standard extending from said bottom to the midportion of said deflector for supporting said deflector with its peripheral edge in adjustable spaced relation to said bottom, means on said standard for vibrating said standard and said deflector, and means for introducing gas under pressure beneath said deflector for flow outwardly between said bottom and said edge of said deflector to aid in discharging and cooling said finely divided material and preventing said finely divided material from accumulating between said floor and said deflector.

WILLIAM SPENCER BOWEN.
WALTER ISAAC McCRUM.

REFERENCES CITED

The following references are of record in the file of this patent:

UNITED STATES PATENTS

| Number | Name | Date |
|---|---|---|
| 449,580 | Dutcher et al. | Mar. 31, 1891 |
| 1,545,376 | Weatherby | July 7, 1925 |
| 1,914,713 | Gelson | June 30, 1933 |
| 1,923,678 | Lowell | Aug. 22, 1933 |
| 1,942,418 | Forte | Jan. 9, 1939 |
| 1,946,566 | Bowen | Feb. 13, 1934 |
| 2,095,283 | Peale | Oct. 12, 1937 |
| 2,175,541 | Probert | Oct. 10, 1939 |
| 2,325,970 | Meyers | Aug. 3, 1943 |
| 2,333,333 | Peebles | Nov. 2, 1943 |